Patented Aug. 27, 1946

2,406,639

UNITED STATES PATENT OFFICE 2,406,639

CATALYTIC REACTIONS

Louis Schmerling and Vladimir N. Ipatieff, Riverside, Ill., assignors to Universal Oil Products Company, Chicago, Ill., a corporation of Delaware No Drawing. Application July 30, 1943,
Serial No. 496,793

18 Claims. (Cl. 260—683.4)

This application is a continuation-in-part of our co-pending application Serial No. 445,201, filed May 30, 1942.

This invention relates to the use of certain novel catalysts for effecting various organic chemical reactions, particularly hydrocarbon conversion reactions.

Aluminum halide catalysts, particularly aluminum chloride and aluminum bromide, have been employed in a wide variety of organic chemical reactions. These catalysts are most often used in alkylation and isomerization reactions which are not easily brought about by the use of other types of catalysts. It is generally desirable to employ a hydrogen halide promoter, such as hydrogen chloride or hydrogen bromide, in conjunction with the aluminum chloride and aluminum bromide catalysts. Although these catalysts have been employed with varying degrees of success, they possess certain serious disadvantages especially when employed in hydrocarbon conversion reactions. The aluminum halide catalysts have a pronounced tendency to form complexes with unsaturated hydrocarbons. Furthermore, these catalysts are generally overactive with the result that extensive side reactions usually occur. Because of these undesirable characteristics of the aluminum halide catalysts, the processes in which they are employed are generally characterized by relatively high catalyst losses and relatively low efficiencies.

One object of the present invention is to modify the activity of the aluminum halide catalyst whereby to overcome the aforementioned disadvantages to a considerable extent. Another object of the invention is to provide a method for conducting hydrocarbon conversion reactions in the presence of a novel and efficient type of catalyst.

Broadly, the invention comprises an improvement in the catalysis of organic chemical reactions of the type which can be catalyzed by an aluminum halide catalyst, said improvement residing in the use of a modified aluminum halide catalyst prepared by the reaction of aluminum chloride or aluminum bromide with a saturated alcohol.

In one specific embodiment the invention comprises a process for the conversion of hydrocarbons wherein said hydrocarbons are contacted under conversion conditions with a catalyst comprising the products formed by interacting approximately equimolar proportions of a saturated aliphatic alcohol and an aluminum halide selected from the group consisting of aluminum chloride and aluminum bromide.

In a further specific embodiment the invention comprises a process for the conversion of paraffin hydrocarbons into other branched chain paraffin hydrocarbons which comprises reacting said paraffins in the presence of a catalyst prepared by interacting approximately equimolar proportions of a saturated aliphatic alcohol and an aluminum halide selected from the group consisting of aluminum chloride and aluminum bromide.

The catalysts which characterize the present invention are formed in accordance with the following type equation:

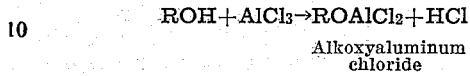

In other words, approximately equimolar proportions of the aluminum halide and the alcohol are interacted in order to form an alkoxy-aluminum halide as the principal reaction product. It is essential to avoid the formation of alcoholates by reaction of more than one molar proportion of alcohol. In most cases there also appears to be a minor amount of a secondary reaction which takes place apparently according to the following equation:

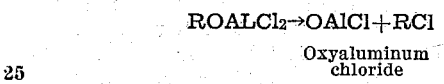

In these equations "R" represents any saturated alkyl radical. Similar equations may be used to indicate the formation of the present types of catalysts by the inter-action of other saturated alcohols, particularly the saturated aliphatic alcohols, with aluminum chloride or aluminum bromide, so that it can be seen that there is a relatively large number of catalysts within the scope of the present invention. Among the saturated aliphatic alcohols which can be employed in the preparation of the catalysts of the present invention are methyl alcohol, ethyl alcohol, normal propyl alcohol, isopropyl alcohol, the butyl alcohols, etc. Such products, while they all have catalytic activity in various hydrocarbon conversion reactions, are not exactly equivalent in their catalytic effectiveness. The catalysts which are most active in reactions such as the isomerization of normal paraffins to isoparaffins, alkylation of isoparaffins and aromatics with olefins, and the polymerization of olefins are usually those produced by interacting approximately equimolar proportions of a substantially dry saturated aliphatic alcohol containing less than eight carbon atoms per molecule with either aluminum chloride or aluminum bromide.

As hereinbefore described, one of the most serious disadvantages of the aluminum halide catalysts resides in their tendency to form complexes or sludges with certain types of hydrocarbons. An important advantage of the catalysts of the present invention over the unmodified aluminum halides is that they do not form liquid complexes with unsaturated hydrocarbons during the hydrocarbon conversion reactions. Instead, the catalyst is generally recovered in substantially the same form in which it was introduced into the process.

In manufacturing catalysts of the present type, the use of relatively low temperatures is preferable since the reactions involved are generally vigorous. In order to avoid formation of the undesired alcoholates and to insure adequate control over the reaction it is preferable to utilize temperatures of the order of 0° C. or lower. Under these conditions approximately equimolar proportions of halide and alcohol are caused to react with the result that approximately one mol of hydrogen halide is evolved per mol of aluminum halide. An alcohol is cooled to a temperature found by preliminary tests to be satisfactory, and finely divided aluminum chloride or aluminum bromide is added to it during vigorous agitation. As hydrogen halide is evolved, the originally liquid alcohol becomes gradually thicker and after passing through a state of high viscosity the reaction mixture solidifies and can be readily broken into a powder and used as such or as particles formed from the powder by pelleting or extrusion methods. The reaction between the aluminum halide and alcohol can also be controlled by conducting the reaction in the presence of a suitable solvent such as a nitroparaffin.

Since the essence of the present invention resides in the modification of the aluminum chloride and aluminum bromide catalysts in order to eliminate certain disadvantages inherent in such catalysts, it will be apparent that our modified catalysts may be utilized in general to catalyze any of the organic chemical reactions which can be catalyzed by the unmodified aluminum chloride or aluminum bromide. In other words, the modified catalysts of this invention may be employed to the same extent and for the same purposes, generally speaking, as aluminum chloride and aluminum bromide catalysts. In particular, the catalysts of the present invention are highly advantageous in effecting various hydrocarbon conversion reactions such as the isomerization of paraffinic or naphthenic hydrocarbons, the alkylation of aromatic, naphthenic, or paraffinic hydrocarbons with olefins or other alkylating agents, the polymerization of olefins, the treatment of hydrocarbon mixtures such as gasoline fractions to improve their antiknock rating, etc. Of the various hydrocarbon conversion reactions, the catalysts herein described find their most important application in the conversion of paraffin hydrocarbons to other branched chain paraffin hydrocarbons, for example, either by isomerization or alkylation.

The hydrocarbons utilized as starting materials for the process of the present invention comprise paraffinic, olefinic, naphthenic, and aromatic hydrocarbons. The paraffins and olefins include both normal and branched chain isomers, while the naphthenes and aromatics comprise cyclic and alkylated cyclic hydrocarbons. The different types of hydrocarbons which may be converted into branched and more-highly branched chain hydrocarbons according to the process of the present invention are hereinafter referred to more completely.

Isobutane is the isoparaffin commonly subjected to alkylation although higher molecular weight isoparaffins also react with olefinic hydrocarbons under similar or modified conditions of operation to produce branched chain paraffinic hydrocarbons of higher boiling point than the isoparaffinic hydrocarbons charged to the process. However, as the higher molecular weight isoparaffins, such as isopentane, isohexane, etc., are themselves valuable constituents of gasoline, they are consequently used less commonly than isobutane as charging stocks for the alkylation process. Normal paraffinic hydrocarbons which may be converted into isoparaffinic hydrocarbons by the present process comprise normal butane and higher boiling paraffinic hydrocarbons of straight-chain structure. Similarly, mildly branched liquid paraffins may be isomerized into more-highly branched chain paraffinic hydrocarbons with substantially higher antiknock value than the less branched compounds charged to the process.

Naphthenic hydrocarbons which may be alkylated or isomerized according to the present process occur generally in admixture with paraffins and aromatics in different crude petroleums. Of the different naphthenic hydrocarbons, also referred to as cycloparaffins, the cyclopentane, cyclohexane, alkyl cyclopentane and alkyl cyclohexane hydrocarbons are generally those which are isomerized or alkylated in the presence of a catalyst of the type herein described to produce naphthenic hydrocarbons of more - highly branched chain structures which are utilizable as constituents of high antiknock gasoline or for other purposes.

Aromatic hydrocarbons, such as benzene, toluene, other alkyl benzene, naphthalene, alkyl naphthalenes, other poly-nuclear aromatics, etc., which are alkylated by olefinic hydrocarbons as hereinafter set forth, may be obtained from any source such as by distillation of coal, by the dehydrogenation of naphthenic hydrocarbons, by the dehydrogenation and cyclization of aliphatic hydrocarbons, etc. Alkyl aromatic hydrocarbons to which we herein refer include both mono-alkyl and poly-alkyl aromatic hydrocarbons which may be converted into more-highly alkylated aromatic hydrocarbons.

Olefinic hydrocarbons utilizable in the present process comprise mono-olefins having one double bond per molecule and poly-olefins having more than one double bond per molecule. Mono-olefins which may be polymerized or be utilized for alkylating isoparaffinic, naphthenic, or aromatic hydrocarbons in the presence of the catalysts herein described are either normally gaseous or normally liquid and include ethylene, propylene, butylenes, amylenes, and higher normally liquid olefins, the latter including various polymers of normally gaseous olefins. Cyclic olefins, such as cyclo-hexene, may also be utilized but generally not under the same conditions of operation as those employed with mono-cyclic olefins. Other olefinic hydrocarbons utilizable in the present process include conjugated diolefins such as butadiene and isoprene and also non-conjugated diolefins and other poly-olefinic hydrocarbons containing more than two double bonds per molecule.

Alkylation of isoparaffinic, naphthenic, and aromatic hydrocarbons may also be effected in the presence of the catalysts of this invention by reacting with these hydrocarbons other alkylating agents which may be considered as capable of producing olefinic hydrocarbons under the conditions of operation chosen for the process. Such alkylating agents include alcohols, ethers, and esters capable of undergoing dehydration or splitting to form olefinic hydrocarbons containing at least two carbon atoms per molecule, which may be considered to be present in the reaction mixture even though possibly only as transient intermediate unsaturates which react further with the saturated hydrocarbons to produce desired reaction products. Alkyl halides may also be employed as alkylating agents in certain cases. In general, however, these various alkylating agents are not equivalent since different operating conditions may be necessary to obtain best results in each case.

The operating conditions for the various hydrocarbon conversion reactions conducted in the presence of the modified aluminum halide catalysts of the present invention are generally about the same as the conditions which may be employed when utilizing the unmodified aluminum halide catalyst. Thus, the alkylation of isoparaffins, naphthenes, or aromatics with olefins or other alkylating agents may be carried out according to the process of the present invention at a temperature of from about −20° C. to about 150° C. The exact temperature to be employed in any given case will depend, of course, upon the particular catalyst and reactants, and can best be determined by small scale experiments. The isomerization of paraffins and naphthenes in the presence of the catalysts of the present invention may also be conducted at a temperature within the range of from about −20° C. to about 150° C. but preferably from about 20° C. to about 125° C. In the case of both alkylation and isomerization reactions it is desirable to employ superatmosphere pressure in order to maintain a substantial portion of the reactants in the liquid phase. In general, however, pressures of from about 1-100 atmospheres may be used. As is well known to those skilled in the alkylation art, it is highly desirable to employ a substantial molar excess of paraffin, naphthenes, or aromatic over the olefin or other alkylating agent in order to promote alkylation as the principal reaction and thus suppress polymerization or other undesirable side reactions.

A hydrogen halide promoter, particularly hydrogen chloride or hydrogen bromide, may be employed with beneficial results with the modified aluminum chloride and aluminum bromide catalysts of this invention. Generally speaking, the hydrogen halide promoter may be used in concentrations of from about 0.5 to about 5.0 mol per cent of the hydrocarbons charged to the process. In certain cases the use of hydrogen may also be beneficial during a reaction.

Catalysts of the present character may be used in any type of operation in which Friedel-Crafts catalysts are commonly employed. For example, they may be suspended as a powder in a hydrocarbon liquid which is to undergo reactions such as isomerization or alkylation, and the reaction may be brought about in batch or continuous apparatus. The addition of a hydrogen halide increases the reaction rates. In other types of operation, the catalysts may be mixed with or deposited upon relatively inert supports, such as activated carbons, Activated Aluminas, partially dehydrated aluminum oxides, bauxite, clays, kieselguhr, etc., and the composites may be utilized in granular form in stationary catalyst beds through which hydrocarbon reactants are continuously passed. The catalysts in powdered form may also be used in the so-called "fluid catalyst" type of operations in which a stream of reactants carries powdered catalyst upwardly through reaction chambers at suitable temperatures, pressures, rates, and proportions of catalyst and reactants, followed by mechanical separation of catalyst, its reactivation if necessary, and recycle of unconverted hydrocarbons, hydrogen halide, and catalyst to further use. In any of these types of operations, hydrogen may be added to the reaction zones to control or minimize undesirable decomposition reactions. It is also within the scope of the present invention to employ the catalysts of the present invention in the form of a solution in a suitable solvent. Among the solvents which may be employed are the nitroparaffins, such as nitromethane, nitroethane, and nitropropane.

The following experimental data are introduced in order to illustrate the application of the novel catalysts of the present invention in the catalysis of various hydrocarbon conversion reactions. However, it is not intended that the scope of the invention be limited in any manner to the exact details of these examples.

EXAMPLE I

The catalyst was prepared by cooling isopropyl alcohol to −78° C. and adding the alcohol to an equimolar proportion of crushed aluminum chloride which had also been cooled to −78° C. A vigorous reaction took place during which large quantities of hydrogen chloride were evolved. The reaction mixture was agitated throughout the course of the reaction. The mixture was a thin fluid at first, but as the reaction proceeded, as evidenced by the evolution of hydrogen fluoride, the contents of the reaction vessel became more viscous and then passed through a gummy stage and finally became a solid material which was readily crushed into a yellow-orange powder. Analysis of the product showed that it contained 22.7% aluminum and 50.7% chlorine. On the basis of this analysis and the weights of the reactants and products, it was calculated that the catalyst consisted of approximately 71% by weight of isopropoxyaluminum chloride and about 29% by weight of oxyaluminum chloride.

About two volumes of isopropyl chloride was added to a mixture of five volumes of benzene and a small amount of the catalyst prepared in the above manner. At atmospheric temperature and pressure a substantial amount of hydrogen chloride was evolved from the reaction mixture, and an appreciable yield of alkyl benzene was detected in the products of the reaction. The catalyst itself became somewhat gelatinous but was otherwise not changed by the reaction.

EXAMPLE II

In this experiment 98 grams of isobutane was reacted with 20 grams propylene in the presence of 9 grams of catalyst prepared as described in connection with Example I. About 2 grams of hydrogen chloride was also added as a promoter. The reaction was carried out in a glass-lined rotating autoclave at a temperature of 70° C. for two hours.

At the completion of the experiment, 93 grams of condensable gas was recovered which comprised 98 mol per cent butanes and 2 mol per cent pentanes. In addition there was recovered 18 grams of liquid alkylation products comprising saturated hydrocarbons of which only about 20% boiled below 140° C. The catalyst was recovered in the form of orange-brown lumps containing absorbed hydrocarbon and weighing 16 grams.

EXAMPLE III

Employing a glass-lined rotating autoclave, 50 grams of normal pentane was isomerized in the presence of 2 grams of HCl and 9 grams of catalyst prepared as described in Example I. After 6 hours at 70° C., approximately 36 grams of hydrocarbon products was removed from the autoclave and was found to have the following analysis on a weight per cent basis:

| | Per cent |
|---|---|
| Isobutane | 7.5 |
| Normal butane | 2.0 |
| Isopentane | 14.0 |
| Normal pentane | 72.0 |
| $C_6$ and higher hydrocarbons | 4.5 |

The catalyst was recovered in the form of brown granules containing absorbed hydrocarbon and weighing 16 grams.

In a similar experiment, 50 grams of normal pentane was contacted with 9 grams of the same catalyst in a rotating autoclave but without the addition of hydrogen chloride. An initial hydrogen pressure of 50 atmospheres was employed in the autoclave. After 6 hours at 100° C., 48 grams of hydrocarbon product was recovered which had the following analysis on a weight per cent basis:

| | Per cent |
|---|---|
| Isobutane | 0.3 |
| Normal butane | 0.9 |
| Isopentane | 10.7 |
| Normal pentane | 86.9 |
| $C_6$ and higher hydrocarbons | 1.2 |

The catalyst was recovered as a tan powder weighing about 8 grams.

EXAMPLE IV

Several experiments were carried out in which normal heptane was isomerized in the presence of the modified aluminum chloride catalyst over a temperature range of 50–175° C. and a pressure range of 1–100 atmospheres. In each case the experiment was conducted in a rotating glass-lined autoclave. At the end of each test the catalyst was recovered in the form of granular material containing absorbed hydrocarbon.

The pertinent experimental data are tabulated below:

Table

| | Run No. | | | | | |
|---|---|---|---|---|---|---|
| | 1 | 2 | 3 | 4 | 5 | 6 |
| Temperature, °C | 80 | 125 | 175 | 150 | 50 | 125 |
| Duration, hrs | 4 | 4 | 4 | 4 | 6 | 6 |
| Pressure, atm.: | | | | | | |
| Initial, $H^2$ | 0 | 100 | 100 | 0 | 50 | 50 |
| Maximum | 6 | 135 | 150 | 13 | 55 | 65 |
| Final, at room temp | 5 | 100 | 100 | 5 | 50 | 50 |
| Reactants charged, gms.: | | | | | | |
| n-heptane | 50 | 50 | 50 | 50 | 50 | 50 |
| HCl | 2 | 0 | 0 | 0 | 0 | 0 |
| Catalyst | 10 | 10 | 9 | 9 | 9 | 6 |
| Total | 62 | 60 | 59 | 59 | 59 | 56 |
| Products, gms.: | | | | | | |
| Condensable gas | 0 | 1 | 1 | 0.0 | 0 | 0.0 |
| Liquid product | 42 | 38 | 39 | 44.0 | 38 | 46.0 |
| Catalyst | 16 | 16 | 12 | 8.5 | 17 | 5.5 |
| HCl | 1 | 1 | 2 | 0.5 | 0 | 2.0 |
| Loss | 3 | 4 | 5 | 6.0 | 4 | 2.5 |
| Total | 62 | 60 | 59 | 59.0 | 59 | 56.0 |
| Distillation of liquid product, vol. per cent: | | | | | | |
| Condensed at 78° C | | | | | 15 | |
| I. B. P. −70° C | | 2 | 2 | | 9 | |
| 70–95 | 6 | 8 | 22 | 11 | 29 | 2 |
| 95–99 | 88 | 77 | 55 | 78 | 43 | 80 |
| Bottoms | 3 | 6 | 5 | 3 | 4 | 3 |

The catalyst employed in runs 1–5 inclusive was prepared in the manner described in Example I. The catalyst used in run 6 was prepared by essentially the same procedure, but normal propyl alcohol was utilized instead of isopropyl alcohol.

The extent of isomerization of the normal heptane is indicated by the volume per cent of 70–95° C. fraction in the liquid product. It is evident that the catalyst prepared from normal propyl alcohol was substantially less active under the conditions tested than the catalyst prepared from isopropyl alcohol. It will thus be apparent that different operating conditions are required dependent upon the particular aluminum halide and the particular alcohol utilized in the preparation of the catalyst.

Of the various operating conditions employed in the first five runs, it appears that the relatively low temperature and low pressure conditions of run No. 5 gave best results as evidenced by the 29% of isoheptanes in the liquid product. There was also considerable cracking in run No. 5 as evidenced by the lower boiling hydrocarbons obtained upon distillation of the liquid product.

Example V

In this experiment the alkoxyaluminum halide catalyst was employed for the alkylation of isobutane in the form of a solution in nitromethane. The utilization of a solvent not only provides a convenient operating method, but also provides a simple and advantageous method of preparing the catalyst.

The catalyst was prepared by adding one mol of isopropyl alcohol to a solution of one mol of aluminum chloride in nitromethane. If a solvent is not employed, it is usually necessary to precool the alcohol and aluminum chloride as described in Example I in order to avoid an excessively violent reaction.

In a glass-lined rotating autoclave, 108 grams of isobutane was reacted with 20 grams of propylene in the presence of the nitromethane solution of catalyst. The reaction was carried out for 4 hours at 80° C. under an initial nitrogen pressure of 30 atmospheres. At the conclusion of the experiment, 96 grams of condensable gas, 33 grams of liquid hydrocarbon, and 53 grams of catalyst layer were recovered. The catalyst was recovered in the form of a dark brown liquid. On a mol per cent basis the condensable gas consisted of 3.3% propane, 88.9% butanes, and 7.8% $C_{5+}$. The distillation of the liquid product revealed that it contained 19% by volume of a fraction boiling from 75–95° C. comprising heptanes. The total yield of liquid product was about 170 weight per cent of the propylene charged.

In a similar experiment, 168 grams of isobutane was alkylated with 40 grams of propylene in the presence of 61 grams of hydrogen chloride and a catalyst prepared by adding 12 grams of isopropyl alcohol to a solution of 30 grams of aluminum chloride in 40 grams of nitromethane. The reaction was carried out in a stirring autoclave. The isobutane and catalyst were introduced into the autoclave and the mixture was stirred for 6 hours at 65° C. with gradual introduction of the propylene over the entire period. The pressure was approximately 10 atmospheres. At the conclusion of the run, 117 grams of condensable gas was recovered which comprised chiefly isobutane. A liquid product amounting to 210 weight per cent of the propylene charged was also recovered. The yield of heptanes was 100% by weight based on the propylene charged. A dark brown catalyst layer weighing 71 grams was removed from the autoclave.

In another test, the catalyst was prepared by the dropwise addition of 2.3 grams of methyl alcohol to a solution of 13 grams of aluminum chloride in nitromethane. A glass-lined rotating autoclave was charged with this catalyst, 80 grams of isobutane, and 20 grams of propylene under an initial nitrogen pressure of 30 atmospheres. The reaction was carried out for 4 hours at 70° C. At the conclusion of the test, 78 grams of condensable gas was recovered comprising on a mol basis 0.9% propane, 92.3% butanes, and 6.8% $C_{5+}$. A liquid product weighing 25 grams was also recovered which contained 12% by volume of heptanes. The catalyst was removed as a dark red-brown liquid weighing 26 grams.

We claim as our invention:

1. A process for the conversion of hydrocarbons which comprises reacting a hydrocarbon in the presence of an alkoxyaluminum halide catalyst prepared by interacting approximately equimolar proportions of a saturated aliphatic alcohol and an aluminum halide selected from the group consisting of aluminum chloride and aluminum bromide and controlling the reaction of said alcohol with said aluminum halide to evolve approximately one mol of hydrogen halide per mol of aluminum halide reacted.

2. The process of claim 1 wherein said aluminum halide consists of aluminum chloride.

3. The process of claim 1 wherein said aluminum halide consists of aluminum bromide.

4. The process of claim 1 wherein said alcohol consists of isopropyl alcohol.

5. A process for the conversion of paraffin hydrocarbons into other branched chain hydrocarbons which comprises reacting a paraffin in the presence of an alkoxyaluminum halide catalyst prepared by interacting approximately equimolar proportions of a saturated aliphatic alcohol and an aluminum halide selected from the group consisting of aluminum chloride and aluminum bromide and controlling the reaction of said alcohol with said aluminum halide to evolve approximately one mol of hydrogen halide per mol of aluminum halide reacted.

6. An alkylation process which comprises reacting an alkylatable paraffin with an olefin under alkylating conditions in the presence of an alkoxyaluminum halide catalyst prepared by interacting approximately equimolar proportions of a saturated aliphatic alcohol and an aluminum halide selected from the group consisting of aluminum chloride and aluminum bromide and controlling the reaction of said alcohol with said aluminum halide to evolve approximately one mol of hydrogen halide per mol of aluminum halide reacted.

7. The process of claim 6 wherein said aluminum halide consists of aluminum chloride.

8. The process of claim 6 wherein said aluminum halide consists of aluminum chloride and said alcohol consists of isopropyl alcohol.

9. An isomerization process which comprises contacting a paraffin hydrocarbon under isomerizing conditions with an alkoxyaluminum halide catalyst prepared by interacting approximately equimolar proportions of a saturated aliphatic alcohol and an aluminum halide selected from the group consisting of aluminum chloride and aluminum bromide and controlling the reaction of said alcohol with said aluminum halide to evolve approximately one mol of hydrogen halide per mol of aluminum halide reacted.

10. The process of claim 9 wherein said aluminum halide consists of aluminum chloride.

11. The process of claim 9 wherein said aluminum halide consists of aluminum chloride and said alcohol consists of isopropyl alcohol.

12. The process of claim 1 wherein a hydrogen halide selected from the group consisting of hydrogen chloride and hydrogen bromide is also present during said conversion reaction.

13. A process for the conversion of hydrocarbons which comprises contacting a hydrocarbon under conversion conditions with an alkoxyaluminum halide catalyst prepared by interacting approximately equimolar proportions of a saturated aliphatic alcohol and an aluminum halide selected from the group consisting of aluminum chloride and aluminum bromide in the presence of a solvent and controlling the reaction of said alcohol with said aluminum halide to evolve approximately one mol of hydrogen halide per mol of aluminum halide reacted.

14. The process of claim 13 wherein said solvent consists of a nitrogen paraffin.

15. The process of claim 1 wherein said alcohol and said aluminum halide are interacted at a temperature below about 0° C.

16. An alkylation process which comprises reacting an alkylatable hydrocarbon with an alkylating agent under alkylating conditions in the presence of an alkoxy aluminum halide catalyst prepared by interacting approximately equimolar proportions of a saturated aliphatic alcohol and an aluminum halide selected from the group consisting of aluminum chloride and aluminum bromide and controlling the reaction of said alcohol with said aluminum halide to evolve approximately one mol of hydrogen halide per mol of aluminum halide reacted.

17. An alkylation process which comprises reacting an aromatic hydrocarbon with an alkylating agent under alkylating conditions in the presence of an alkoxy aluminum halide catalyst prepared by interacting approximately equimolar proportions of a saturated aliphatic alcohol and an aluminum halide selected from the group consisting of aluminum chloride and aluminum bromide and controlling the reaction of said alcohol with said aluminum halide to evolve approximately one mol of hydrogen halide per mol of aluminum halide reacted.

18. The process of claim 17 wherein said alkylating agent comprises an alkyl halide.

LOUIS SCHMERLING.
VLADIMIR N. IPATIEFF.